No. 656,453. Patented Aug. 21, 1900.
D. FRESE.
SALT FEEDER FOR STOCK.
(Application filed Feb. 6, 1900.)
(No Model.)

Witnesses
Inventor,
Diedrich Frese
by Jos. H. Hunter
Attorneys

UNITED STATES PATENT OFFICE.

DIEDRICH FRESE, OF FONTANELLE, IOWA.

SALT-FEEDER FOR STOCK.

SPECIFICATION forming part of Letters Patent No. 656,453, dated August 21, 1900.

Application filed February 6, 1900. Serial No. 4,205. (No model.)

*To all whom it may concern:*

Be it known that I, DIEDRICH FRESE, a citizen of the United States, residing at Fontanelle, in the county of Adair and State of Iowa, have invented certain new and useful Improvements in Salt-Feeders for Stock; and I do hereby declare the following to be a full, clear, and exact description of the invention, such as will enable others skilled in the art to which it appertains to make and use the same.

This invention relates to improvements in a feeding device for stock, and is more especially intended for feeding salt, though it will be readily understood the improvements are applicable also for feeding other granular or loose material.

One of the objects of the invention is to provide means for agitating or loosening the salt so that it will feed to the licking-trough, which means are provided with one or more operating devices in such location that without any particular knowledge on the part of the stock the same will be operated and the salt fed to the stock in approaching the licking-trough.

A further object of the invention is to locate the operating device or devices for the feeding means beneath the feeder, so that the same will be engaged or contacted and operated by an animal in approaching the trough.

A further object of the invention is to provide means operating to limit the movement of the feed-operating device which shall nevertheless permit a further movement of the device, so that, for instance, if an animal moves the operating device until it engages said stop device nevertheless a second animal in engaging said device will be permitted to move the device in the same direction and feed the salt.

A further object is to provide a yielding stop for the operating device for the purpose just recited.

A further object of the invention is to construct a generally improved and simplified feeding device for supplying salt or the like to stock.

With such and other objects in view the invention is embodied in the novel parts, arrangement, and combinations of parts hereinafter described, and particularly set forth in the claims.

In the accompanying drawings I have shown a practical embodiment of my invention; but I desire it understood that I do not wish to limit the same in its useful applications to the construction which I have there shown for the purpose of illustration.

Figure 1:
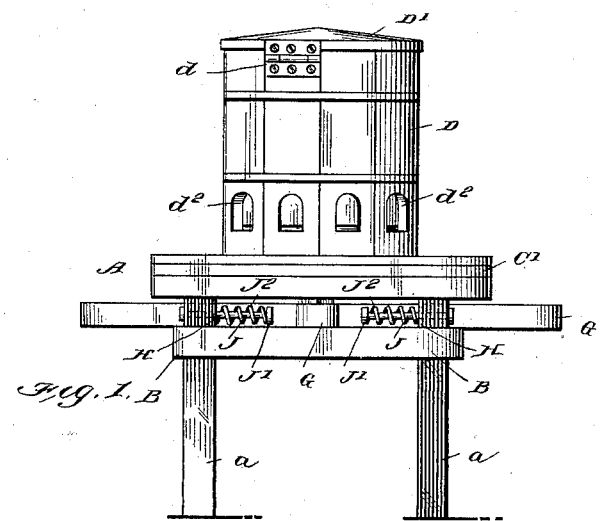
Figure 2:
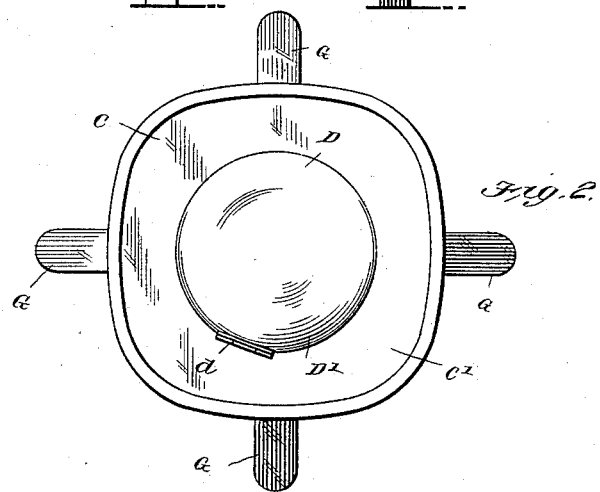
Figure 3:
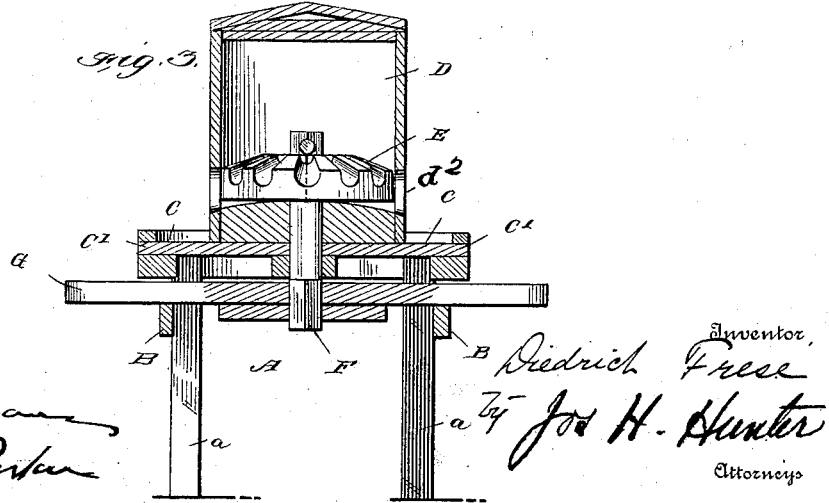

In the drawings, Figure 1 is a side elevation of a salt-feeder for stock embodying my improvements. Fig. 2 is a plan view thereof, and Fig. 3 is a vertical sectional view.

Referring to the drawings, A indicates a suitable stand or frame of any approved or suitable construction and is shown as comprising legs or uprights $a$, connected at or near their upper ends by horizontal stays or tie-rods B. Supported on the stand or base A is a licking-trough, (indicated at C.) Above the trough C and conveniently supported thereby is a hopper or holder D for the salt or other material to be fed to the stock. As shown, the hopper or box D is supported centrally on the platform or bottom C' of the trough, so as to form, in effect, a trough or gutter surrounding the box or hopper D. The box D is provided with a suitable cover D', which is shown as hinged thereto at $d$. The box is preferably circular in horizontal cross-section and is shown as provided at its lower part with a series of feed-openings $d^2$, through which the salt is adapted to feed to the trough C.

Within the box or hopper D is a feed device, which may be of any approved or suitable construction, it being shown as a substantially-cone-shaped piece E, mounted on a vertical shaft F, which latter is shown as extending through a suitable bearing-opening in the trough, the shaft extending below the latter. The upper surface or conical surface of the cone E is provided with a series of channels or grooves which provide a series of intermediate projections or ribs adapted to grind off or loosen the salt when the same becomes hard or clogged in the box, the grooves being so arranged with relation to the feed-openings $d$ as to direct the ground or loosened salt to the same.

As is well known, in this class of devices the stock are relied upon to operate the loosening or feeding device for the salt and it is the aim of my invention to insure its operation. I have therefore shown secured to the lower part of the shaft F one or more radially-projecting operating-arms G, extending laterally beyond the trough and beneath the same, preferably between the trough and cross-bars B, which latter provide an efficient bearing for the operating-arms. Four operating-arms G are shown in the drawings. These arms are so located that the stock in approaching the trough to lick the salt will strike the arms, the arms being at about the height of the breast of the animal. It will therefore follow that the stock in approaching the trough and moving or crowding about the same will without any knowledge on the part of the stock move the feeding device through the arms G and properly feed the salt to the trough. As will be evident, the shaft F and the grinder or feeding device E secured thereon will be oscillated by the horizontal movement or deflection of the arms G by the stock.

H indicates a stop device for limiting the movement of the arms G. I have shown in the drawings two of these devices, one intended to limit the movement of the arms G in one direction and the other in the opposite direction. The devices are similar and each comprises a plunger J, slidably mounted in a bearing on a suitable part of the frame—as, for instance, one of the legs $a$. The plunger J is provided at one end with a buffing-head J', with which one of the arms G is adapted to engage. Between the head J' and the bearing is a yielding cushion, shown in the form of a spring $J^2$, sleeved on the plunger J and acting to hold the head toward one arm G. The other end of the plunger J is provided with a suitable head or shoulder to prevent the disengagement from the bearing. The purpose of the stop device H is as follows: Supposing the operating-arms for the feeding device to have been moved in one direction until one arm engages the plunger of said stop device, the same will be held yieldingly by the plunger, so that should another animal approach the trough and attempt to move the operating arm or arms in the same direction a movement thereof will be permitted sufficient to cause the operation of the feeding device and feeding of the salt to the trough, so that no matter in what position the operating-arms are left still the same can be moved in either direction and the salt fed. It will be evident that without the yielding stop device should the operating-arms be moved to the full limit of their movement in one direction the attempt of an animal to move the arms in the same direction would be prevented, and unless by instinct the animal should move the arm in the opposite direction there would be no movement of the feed device and no salt supplied to the trough. As above stated, one of said yielding stop devices is provided to yieldingly limit the movement of the operating-arms in each direction.

Having thus described my invention, what I claim as new, and desire to secure by Letters Patent, is—

1. In a salt-feeder for stock, the combination of a trough, a hopper, a feed device within the hopper, and operating means for said feed device, extending laterally beyond said trough, in a position to be engaged by an animal approaching the trough, substantially as described.

2. In a salt-feeder for stock, the combination of a trough, a hopper above the trough having feed-openings to direct the material from the hopper to the trough, a feed device in said hopper, and operating means for said feed device extending laterally beyond the trough beneath the same, substantially as described.

3. In a salt-feeder for stock, the combination of a trough, supporting means therefor, a hopper above the trough adapted to supply the material thereto, a feeding device within said hopper, an operating-shaft therefor extending below the trough, an arm secured to said shaft and projecting laterally beyond the trough below the same, in position to be engaged and operated by stock approaching the trough, substantially as described.

4. In a salt-feeder for stock, the combination of a hopper, a feed device for feeding material from the hopper, an operating device therefor and yielding means adapted to limit the movement of said operating device, substantially as described.

5. In a salt-feeder for stock, the combination of a hopper, a feed device for feeding material from the hopper, an operating device for said feed device, a spring-pressed stop with which said operating device is adapted to engage, substantially as described.

6. In a salt-feeder for stock, the combination of a hopper, a feeding device for feeding material from the hopper, an operating-arm therefor, and a spring-pressed plunger on each side of said arm with which the same is adapted to engage, substantially as described.

7. In a feeder for stock, the combination of a trough, a hopper located centrally thereon and provided with feed-openings, a feed device within said hopper, a vertical shaft connected to said feed device and extending below the trough, and one or more lateral arms fixed to said shaft below the trough and extending laterally beyond the trough, substantially as described.

8. In a salt-feeder for stock, the combination of a trough, a support therefor, a hopper above said trough, a feed device within the hopper for feeding the salt to said trough, an operating-shaft for said device extending below said trough, an operating-arm secured to said shaft and projecting laterally beyond the trough, and a spring-pressed plunger supported by said support and with which said arm is adapted to engage, substantially as described.

In testimony whereof I affix my signature in presence of two witnesses.

DIEDRICH FRESE.

Witnesses:
 JOHN W. EVANS,
 C. H. KRAMER.